(12) United States Patent
Jang

(10) Patent No.: US 11,080,319 B2
(45) Date of Patent: Aug. 3, 2021

(54) SYSTEM AND METHOD FOR PROVIDING IMAGE SEARCH RESULT ONLINE USING DEVICE INFORMATION

(71) Applicant: NHN Entertainment Corporation, Seongnam-si (KR)

(72) Inventor: Miyoung Jang, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 444 days.

(21) Appl. No.: 15/654,518

(22) Filed: Jul. 19, 2017

(65) Prior Publication Data

US 2018/0025006 A1 Jan. 25, 2018

(30) Foreign Application Priority Data

Jul. 20, 2016 (KR) ........................ 10-2016-0091927

(51) Int. Cl.
```
G06F 16/00      (2019.01)
G06F 16/432     (2019.01)
G06F 16/41      (2019.01)
G06F 16/188     (2019.01)
G06F 16/907     (2019.01)
```
(52) U.S. Cl.
CPC .......... *G06F 16/434* (2019.01); *G06F 16/196* (2019.01); *G06F 16/41* (2019.01); *G06F 16/907* (2019.01)

(58) Field of Classification Search
CPC .... G06F 16/434; G06F 16/532; G06F 16/907; G06F 16/5866; G06F 16/41
See application file for complete search history.

(56) References Cited

U.S. PATENT DOCUMENTS

| | | | | |
|---|---|---|---|---|
| 9,069,794 | B1* | 6/2015 | Bandukwala | G06K 9/46 |
| 10,331,729 | B2* | 6/2019 | Rathus | G06F 21/60 |
| 2006/0209089 | A1* | 9/2006 | Date | H04N 1/00196 345/632 |
| 2009/0063431 | A1* | 3/2009 | Erol | G06K 9/00463 |
| 2009/0070110 | A1* | 3/2009 | Erol | G06K 9/00463 704/236 |
| 2010/0260426 | A1* | 10/2010 | Huang | G06K 9/20 382/218 |
| 2011/0106782 | A1* | 5/2011 | Ke | G06F 16/5838 707/706 |
| 2011/0134248 | A1* | 6/2011 | Heit | G06Q 20/04 348/161 |
| 2011/0157221 | A1* | 6/2011 | Ptucha | H04N 1/00198 345/629 |

(Continued)

FOREIGN PATENT DOCUMENTS

| | | |
|---|---|---|
| JP | 2007-079850 | 3/2007 |
| JP | 2015-146202 | 8/2015 |

*Primary Examiner* — Leslie Wong
(74) *Attorney, Agent, or Firm* — H.C. Park & Associates, PLC

(57) ABSTRACT

A method of providing an image search result online using device information including: receiving an input of a search query; identifying first device information of a device from the search query; indexing an image that matches the first device information by comparing the first device information to second device information included in metadata of the image; and providing the indexed image that matches the first device information as a search result of the search query.

15 Claims, 7 Drawing Sheets

(56) References Cited

U.S. PATENT DOCUMENTS

| | | | | |
|---|---|---|---|---|
| 2011/0258222 A1* | 10/2011 | Park | ........................ | G06F 16/58 |
| | | | | 707/769 |
| 2012/0209833 A1* | 8/2012 | Kramer | ................. | G06F 16/583 |
| | | | | 707/723 |
| 2013/0007032 A1* | 1/2013 | Klappert | ................ | G06F 16/434 |
| | | | | 707/759 |
| 2013/0036134 A1* | 2/2013 | Neven | ................. | G06K 9/00288 |
| | | | | 707/769 |
| 2013/0332317 A1* | 12/2013 | Boncyk | .................. | G06Q 20/10 |
| | | | | 705/26.62 |
| 2013/0346431 A1* | 12/2013 | Erol | ................... | G06K 9/00463 |
| | | | | 707/758 |
| 2015/0100578 A1* | 4/2015 | Rosen | ............... | G06F 17/2247 |
| | | | | 707/737 |
| 2015/0193469 A1* | 7/2015 | Hagiwara | ............... | G06Q 10/06 |
| | | | | 345/589 |
| 2016/0021152 A1* | 1/2016 | Maguire | ............. | G06F 16/5866 |
| | | | | 709/204 |
| 2016/0217158 A1* | 7/2016 | Watanabe | .............. | G06F 16/532 |
| 2017/0185670 A1* | 6/2017 | Dua | ..................... | G06F 16/5866 |
| 2017/0286493 A1* | 10/2017 | Petrou | ................... | G06F 16/583 |
| 2017/0351709 A1* | 12/2017 | Kong | .................... | G06F 16/951 |
| 2019/0258683 A1* | 8/2019 | Folkens | .................. | G06F 3/013 |

\* cited by examiner

FIG. 6

| Device information | | | | | | | | | | | |
|---|---|---|---|---|---|---|---|---|---|---|---|
| Width | Height | Location information | Captured date | Vertical resolution | Horizontal resolution | Bit depth | Number of frames | Focal distance | Shutter speed | Camera module | ... |

610

600

SYSTEM AND METHOD FOR PROVIDING IMAGE SEARCH RESULT ONLINE USING DEVICE INFORMATION

CROSS-REFERENCE TO RELATED APPLICATION

This application claims priority from and the benefit of Korean Patent Application No. 10-2016-0091927, filed on Jul. 20, 2016, which is hereby incorporated by reference for all purposes as if fully set forth herein.

BACKGROUND

Field

Exemplary embodiments relate to technology for providing a search result. More particularly, exemplary embodiments relate to a method and system for providing an image search result using device information.

Discussion of the Background

With the development of the Internet and an increase in Internet distribution, various services using the Internet are provided and may include a search service as a representative example. A search service refers to a service that provides a user with a search result of a keyword in response to user input of the keyword, a word, or a combination of words desired to search for. Currently, to meet various search requests of users, the search service may provide the search result using text and an image.

For example, a user may conduct an online search online to verify screen quality or image capturing ability of a device by inputting a keyword, for example, device information and may receive a search result of the keyword through the search service. However, in the related art, the search service generally provides an image of an external appearance of the device or an image provided from a manufacturer instead of an image captured by the device. Thus, the search service may not satisfy the user's intent.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a method and system that may index an image that matches device information included in a search query by comparing the device information to metadata included in an image, and may provide the image that matches the device information as a search result.

Additional aspects will be set forth in the detailed description which follows, and, in part, will be apparent from the disclosure, or may be learned by practice of the inventive concepts.

According to exemplary embodiments, a method of providing an image search result online using device information may include: receiving an input of a search query; identifying first device information of a device from the search query; indexing an image that matches the first device information by comparing the first device information to second device information included in metadata of the image; and providing the indexed image that matches the first device information as a search result of the search query.

The indexing of the image may include: searching for the image associated with the first device information included in the search query; and determining whether the second device information is included in the metadata of the image.

The indexing of the image may further include: extracting the second device information associated with the first device information from content in which the image is included, in response to determining that the metadata of the image does not include the second device information; and indexing the image included in the content.

The identifying of the first device information may include: identifying at least one of type information of the device, a model name of the device, and a name of the device as the first device information.

The providing of the indexed image may include: including the second device information in metadata of an image uploaded from a user that is captured from a device matching the first device information; and providing the uploaded image as the search result.

The providing of the indexed image may include: changing metadata of the image uploaded from the user in response to changing of the image uploaded from the user; and indicating the change in the metadata.

The providing of the indexed image may include: sorting and providing a plurality of images that match the first device information based on a predetermined criterion.

The method of providing an image search result online using device information may further include: providing an image searched according to the search query and the second device information extracted from the metadata of the image as the search result of the search query in response to identifying that the search query does not include the first device information.

According to exemplary embodiments, a non-transitory computer-readable storage medium may include instructions that, when executed by a processor, cause the processor to perform a method of providing an image search result online using device information including: receiving an input of a search query; identifying first device information of a device from the search query; indexing an image that matches the first device information by comparing the first device information and the second device information included in metadata of the image; and providing the indexed image that matches the first device information to be output as a search result of the search query.

According to exemplary embodiments, an online image search result providing system may include: a receiver configured to receive an input of a search query; an identifier configured to identify first device information of a device from the search query; an indexer configured to index an image that matches the first device information by comparing the first device information to second device information included in metadata of the image; and a provider configured to provide the image that matches the first device information as a search result of the search query.

The indexer may be configured to search for the image associated with the first device information included in the search query, and to determine whether the second device information is included in the metadata of the image.

The indexer may be configured to extract information associated with the first device information from content in which the image is included, in response to determining that the metadata of the image does not include the second device information, and to index an image included in the content.

The identifier may be configured to identify at least one of type information of the device, a model name of the device, and a name of the device as the first device information.

The provider may be configured to include the second device information in metadata of an image uploaded by a user that is captured from a device matching the first device information, and to provide the uploaded image as the search result.

The provider may be configured to change metadata of the image uploaded from the user in response to changing of the image uploaded from the user, and to indicate the change in the metadata.

The provider may be configured to sort and provide a plurality of images that match the first device information based on a predetermined criterion.

The provider may be configured to provide an image searched according to the search query and the second device information extracted from the metadata of the image as the search result of the search query in response to identifying that the search query does not include the first device information.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 6 illustrates an exemplary format of metadata included in an image according to exemplary embodiments.

DETAILED DESCRIPTION OF THE ILLUSTRATED EMBODIMENTS

Figure 1:
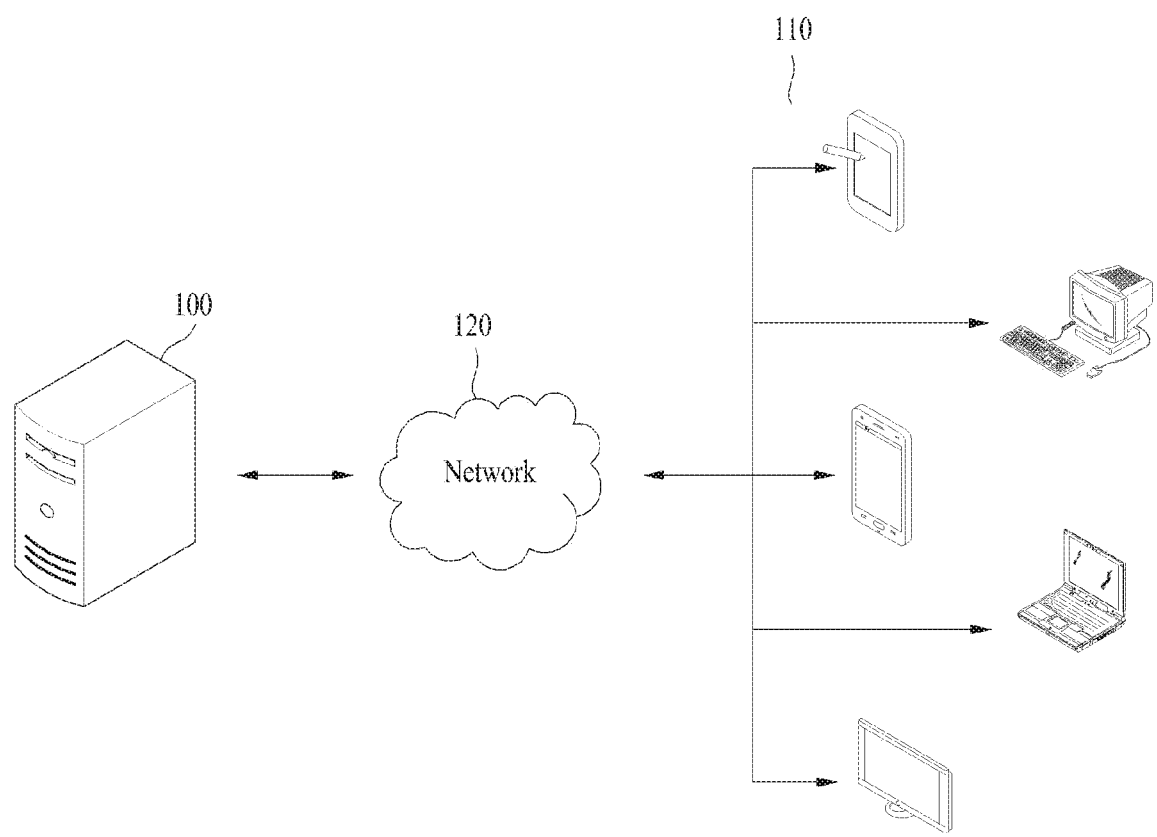
FIG. 1 illustrates an exemplary network environment according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of elements, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 illustrates an exemplary network environment according to exemplary embodiments. Referring to FIG. 1, the network environment includes a terminal 110, a server 100, and a network 120. FIG. 1 is provided only as an example and thus, a number of terminals and/or a number of servers are not limited thereto according to the exemplary embodiments.

The terminal 110 may be a fixed terminal or a mobile terminal configured as a computer device. For example, the terminal 110 may be a smartphone, a mobile phone, navigation, a computer, a laptop computer, a digital broadcasting terminal, a personal digital assistant (PDA), a portable multimedia player (PMP), a tablet personal computer (PC), and the like. For example, the terminal 110 may communicate with other terminals and/or the server 100 over the network 120 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 120. For example, the network 120 may include at least one of a plurality of networks, for example, a personal area network (PAN), a local area network (LAN), a campus area network (CAN), a metropolitan area network (MAN), a wide area network (WAN), a broadband network (BBN), the Internet, and the like. Also, the network 120 may include at least one network topology that include a bus network, a star network, a ring network, a mesh network, a star-bus network, a tree or hierarchical network, and the like. However, it is only an example, and the exemplary embodiments are not limited thereto.

The server 100 may be configured as a computer apparatus or a plurality of computer apparatuses that provides instructions, codes, files, contents, services, and the like through communication with the terminal 110 over the network 120. An image search result providing system may operate through the server 100, for example, an image search result providing server.

According to the exemplary embodiments, the server 100 may be the image search result providing server configured to provide an image search result to the terminal 110 connected through the network 120. The server 100 may index an image that matches device information by compare the device information to device information of metadata included in an image, and may provide the image as a search result of a search query. Here, the terminal 110 may output an image search result provided from the server 100 as the search result.

Figure 2:
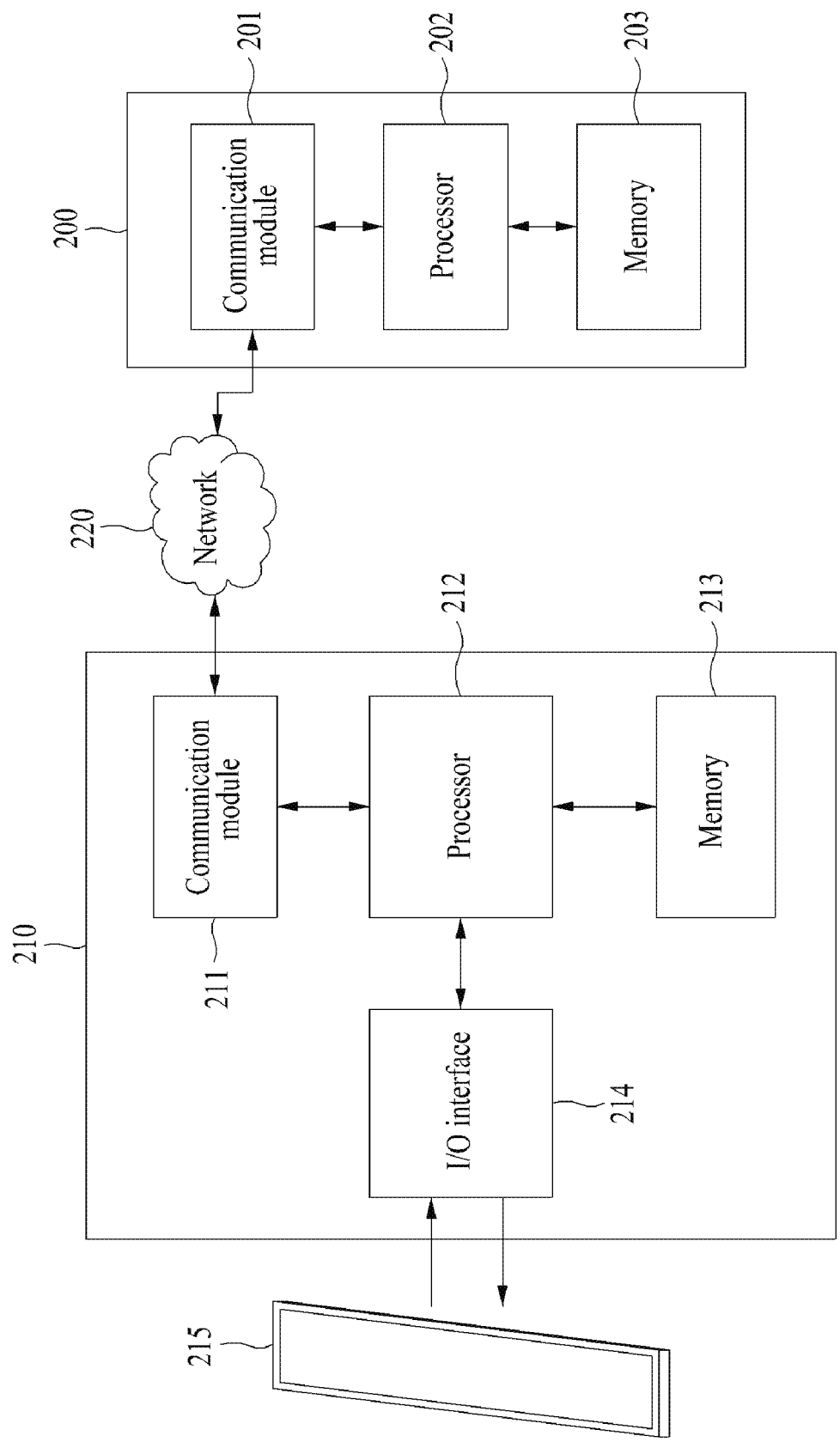
FIG. 2 illustrates an exemplary configuration of a terminal and a server according to exemplary embodiments.

FIG. 2 illustrates an exemplary configuration of a terminal and a server according to exemplary embodiments.

An internal configuration of a terminal 210 and a server 200 is described with reference to FIG. 2. Other terminals as well as the server 200 may be included in the network environment of FIG. 1. The same or similar internal components may be applicable to other terminals and/or other servers included in the network environment of FIG. 1.

Referring to FIG. 2, the terminal 210 may include, for example, a communication module 211, a processor 212, a memory 213, and an input/output (I/O) interface 214. The server 200 may include a memory 203, a processor 202, and a communication module 201.

The memory 203 and 213 may include a permanent mass storage device, such as random access memory (RAM), read only memory (ROM), a disk drive, etc., as a computer-readable storage medium. Also, an operating system (OS) and at least one program code, for example, a code for an application or a browser installed and executed on the terminal 210, etc., may be stored on the memory 203 and 213. Such software components may be loaded from another computer-readable storage medium separate from the memory 203 and 213. The other computer-readable storage medium may include, for example, a floppy drive, a disk, a tape, a DVD/CD-ROM drive, a memory card, etc. According to other exemplary embodiments, software components may be loaded to the memory 203 and 213 through the communication module 201 and 211, instead of, or in addition to, the computer-readable storage medium. For example, at least one program may be loaded to the memory 203 and 213 based on a program, for example, the application, installed by files provided over a network 220 from developers or a file distribution system, for example, the server 200, which provides an installation file of the application.

The processor 202 and 212 may be configured to process computer-readable instructions, for example, the aforementioned at least one program code, of a computer program by performing basic arithmetic operations, logic operations, and I/O operations. The computer-readable instructions may be provided from the memory 203 and 213 and/or the communication module 201 and 211 to the processor 202 and 212. For example, the processor 202 and 212 may be configured to execute received instructions in response to the program code stored on the storage device, such as the memory 203 and 213.

The communication module 201 and 211 may provide a function for communication between the terminal 210 and the server 200 over the network 220, and may provide a function for communication with another client or another server. For example, the processor 212 of the terminal 210 may transfer a request created based on a program code stored on the storage device such as the memory 213, to the server 200 over the network 220 under control of the communication module 211. The terminal 210 may receive a control signal, an instruction, content, a file, etc., provided under control of the processor 202 of the server 200 via the communication module 201 and the network 220 may be received by the terminal 210 via the communication module 211 of the terminal 210. For example, a control signal, an instruction, etc., of the server 200 received through the communication module 211 may be transferred to the processor 212 or the memory 213, and content, a file, etc., may be stored on a storage medium, which may be further included in the terminal 210.

The I/O interface 214 may provide an interface with an I/O device. For example, an input device may include a keyboard, a mouse, etc., and an output device may include a device, such as a display for displaying a communication session of an application. As another example, the I/O interface 214 may provide an interface with an apparatus in which an input function and an output function are integrated into a single function, such as a touch screen. In detail, when processing instructions of the computer program loaded to the memory 213, the processor 212 of the terminal 210 may display a service screen configured using data provided from the server 200 or another terminal, or may display content on a display 215 through the I/O interface 214.

According to the exemplary embodiments, the terminal 210 and the server 200 may include a greater or lesser number of components than the number of components shown in FIG. 2. For example, the terminal 210 may include at least a portion of the I/O device, or may further include other components, for example, a transceiver, a global positioning system (GPS) module, a camera, a variety of sensors, a database, and the like.

Figure 3:
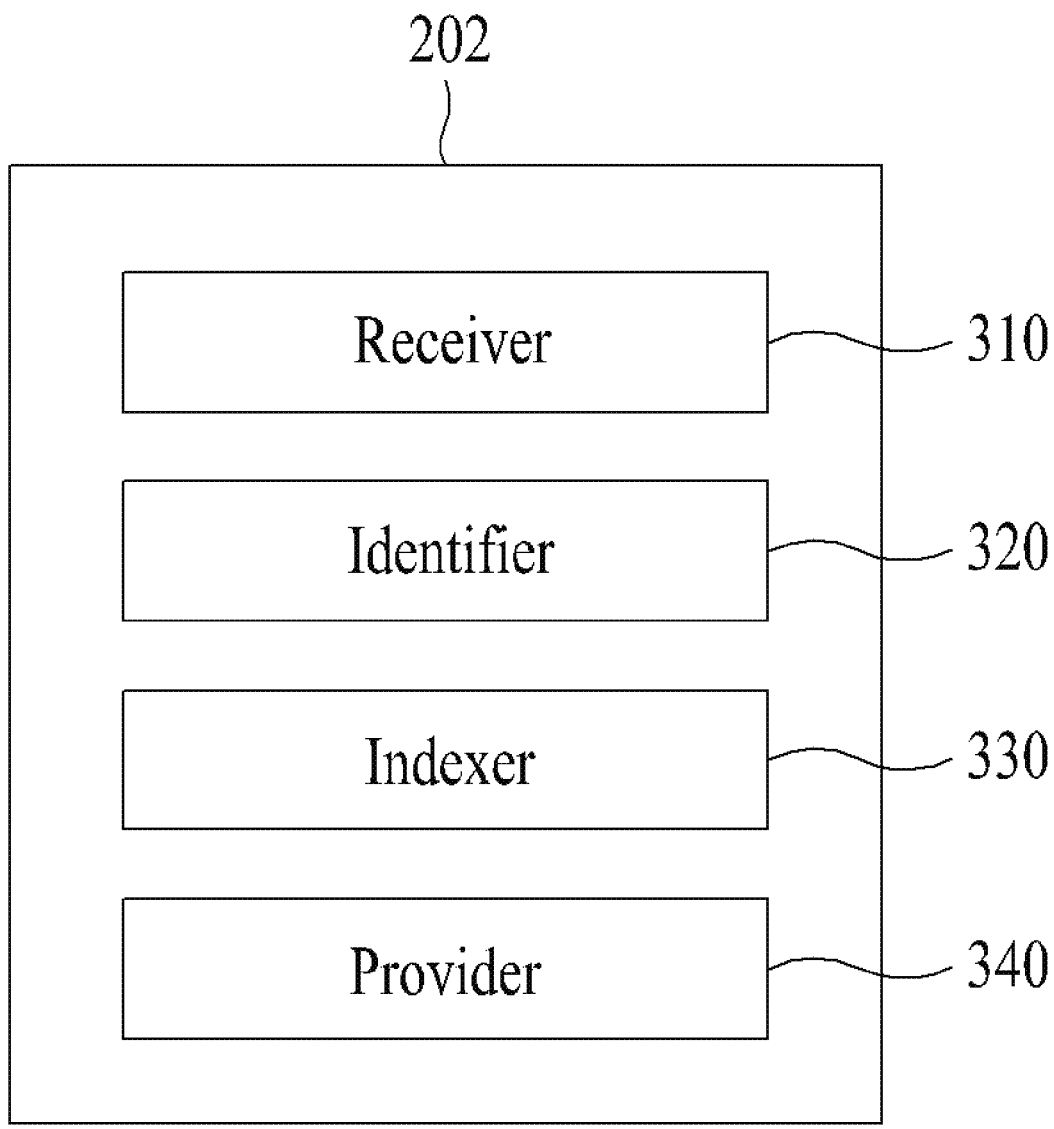
FIG. 3 illustrates exemplary components included in a processor of an image search result providing server according to exemplary embodiments.
Figure 4:
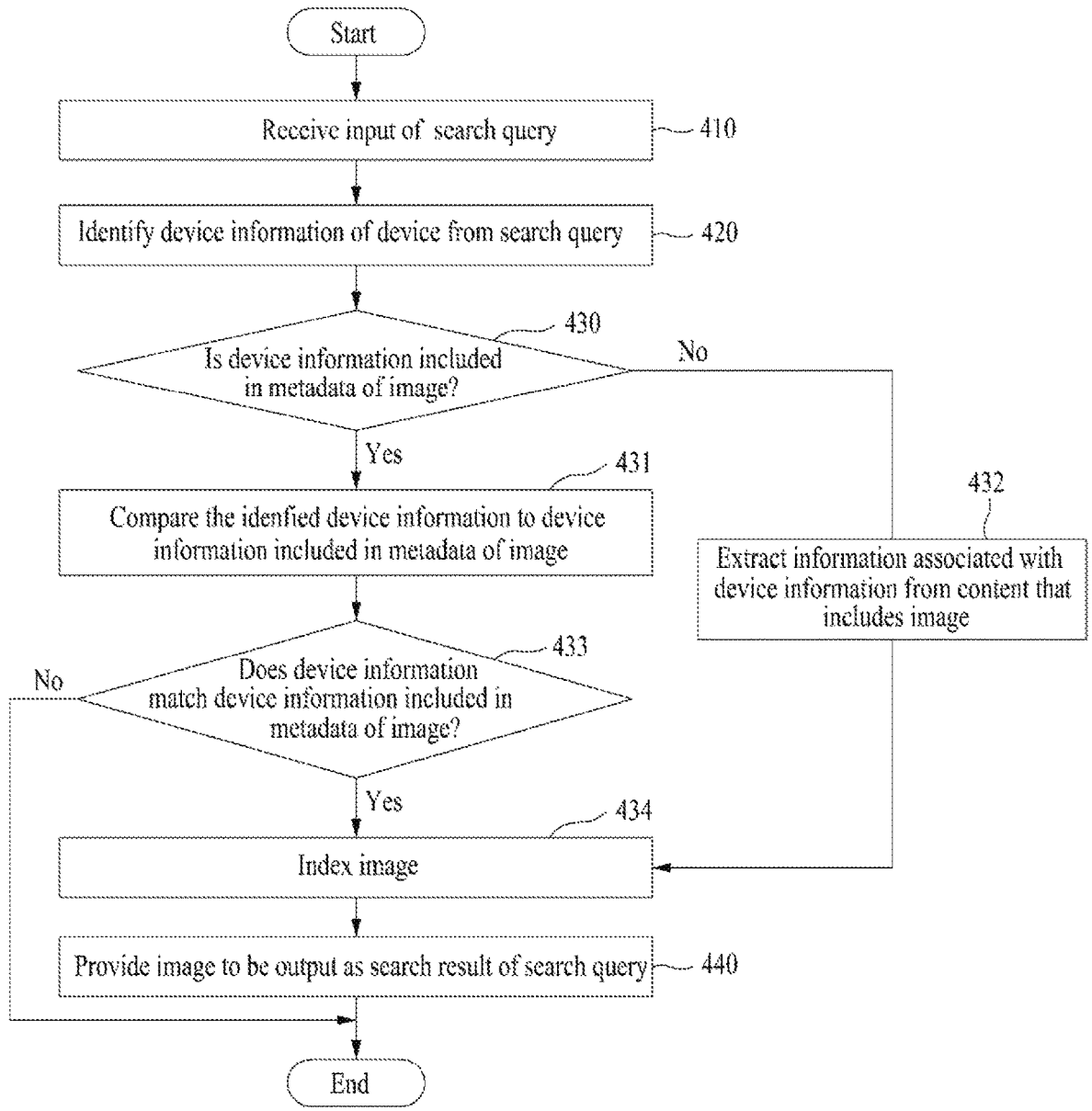
FIG. 4 is a flowchart illustrating an image search result providing method of an image search result providing server according to exemplary embodiments.

FIG. 3 illustrates exemplary components included in a processor of an image search result providing server according to exemplary embodiments, and FIG. 4 is a flowchart illustrating an image search result providing method of an image search result providing server according to exemplary embodiments.

Referring to FIG. 3, a processor 202 included in the image search result providing server may include a receiver 310, an identifier 320, an indexer 330, and a provider 340. The processor 202 and the components of the processor 202 may control the image search result providing server to perform operations 410, 420, 430, 431, 432, 433, 434, and 440 included in the image search result providing method as illustrated in FIG. 4. Here, the processor 202 and the components of the processor 202 may be configured to execute instructions according to a code of at least one program and a code of an OS included in a memory. The components of the processor 202 illustrated in FIG. 3 may also be representations of different functions performed by the processor 202 according to a control instruction provided from a program code stored on the image search result providing server.

The processor 202 may load a program code of a program for the image search result providing method stored in the memory as a file. For example, in response to an execution of the program on the image search result providing server, the processor 202 may control the image search result providing server to load the program code from the file of the program to the memory under control of the OS.

Figure 5:
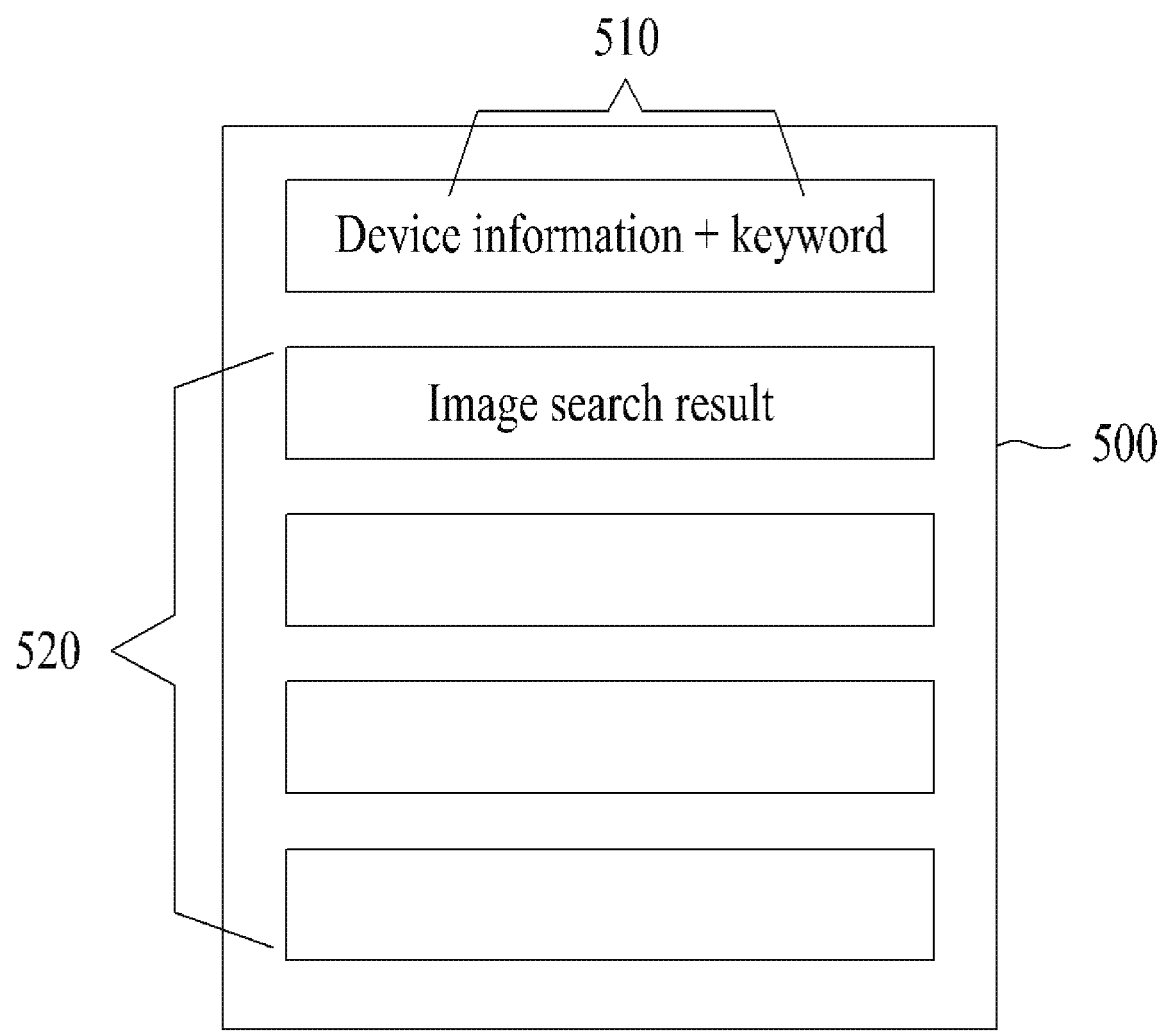
FIG. 5 illustrates an exemplary search screen providing an image as a search result at an image search result providing server according to exemplary embodiments.

A method of providing an image as a search result is described with reference to FIG. 5. FIG. 5 illustrates an exemplary search screen providing an image as a search result at an image search server according to exemplary embodiments. Here, a method of providing result of an image search may be applicable to various environments including, for example, a search service, a bulletin board, a social network service (SNS), etc., in which postings are uploaded and information is shared between users.

In operation 410, the receiver 310 may receive an input of a search query.

In operation 420, the identifier 320 may identify device information of a device from the search query. The identifier 320 may identify at least one of type information of the device, a model name of the device, and a name of the device as the device information. Referring to FIG. 5, the identifier 320 may identify device information in response to a user that inputs a search query 510 that includes the device information, for example, "BB device manufactured by company AA", and a keyword, for example, comments, sense of color, reviews, etc., on a search screen 500.

For example, the identifier 320 may store, in a database, device information of a device, for example, a camera, a mobile phone, etc., having a camera function. The identifier 320 may identify the device information by comparing the device information included in the search query to the device information stored in the database. The database may be updated every time a new device is released, and may store device information including a name of a device, type information of the device, a model name of the device, and the like.

In operation 430, the indexer 330 may determine whether metadata of an image includes the device information of the device. When the device information of the device is included in the metadata of the image, the indexer 330 may compare the device information of the device to the device information included in the metadata of the image in operation 431. In operation 433, the indexer 330 may determine whether the device information of the device matches the device information included in the metadata of the image. When the device information of the device does not match the device information included in the metadata of the image, the indexer 330 may terminate a process. Conversely, when the device information of the device matches the device information included in the metadata of the image, the indexer 330 may index the image in operation 434.

When the metadata of the image does not include the device information of the device, the indexer 330 may extract information associated with the device information from content that includes the image in operation 432. For example, the indexer 330 may extract information associated with the device information of the device from content, for example, a web document, a blog, café writing, a document file, a posting, news, etc., that includes an image in operation 432, and may index the image included in the content in operation 434. In detail, the indexer 330 may extract information associated with the device information of the device from associated information, for example, writings, images, etc., that is included in the content, and may index the image included in the content in operation 434.

In operation 440, the provider 340 may provide the image as a search result of the search query. For example, referring to FIG. 5, a plurality of images may be displayed on the search screen 500 as a search result 520. Here, the provider 340 may sort and provide the plurality of images that matches the device information of the device based on a preset criterion. For example, the provider 340 may sort and display the plurality of images as the search result 520 on the search screen 500 in an order of accuracy or relevance with reference to the device information. Here, the provider 340 may sort and display the plurality of images from latest to oldest. Also, the provider 340 may also provide an interface of reordering the search result 520 displayed on the search screen 500. That is, the images included in the search result 520 may be reordered through the interface based on a criterion preset by the user and displayed on the search screen 500.

The provider 340 may include the device information in metadata of an image that is captured from a device matched to the device information and uploaded from the user, and may provide the uploaded image as the search result. The provider 340 may change the metadata of the image uploaded from the user in response to changing of the image uploaded from the user and may notify the change in the metadata.

FIG. 6 illustrates an exemplary format of metadata included in an image according to exemplary embodiments.

Referring to FIG. 6, metadata 600 of an image may be configured in an exchangeable image file format (Exif). Here, the image may include various types, for example, a photo, a screenshot, etc.

The exchangeable image file format Exif refers to an image file tag structure stored in an image file specifying the format for the image file. The exchangeable image file format may include metadata, for example, device information 610, a width (pixel), a height (pixel), a horizontal resolution (dpi), a vertical resolution (dpi), a bit depth, a number of frames, a device manufacturer, a camera model, a lens, a representative color, a shutter speed, a focal distance, an ISO speed, an exposure program, exposure correction, a captured date, cored data, location information received from a GPS, and the like.

The metadata 600 of the image may include the device information 610. Although the device information 610 is included in the metadata 600 of the image, the device information 610 included in the metadata 600 may be altered in response to a user manipulation. For example, if the user edits the image using an image tool, at least a part of the device information in the metadata 600 of the image may be edited. If the image is uploaded to a service, the service may convert the image file to be suitable for a format of the service, which may lead to editing or losing partial information of the metadata 600 of the image.

Further, the image search result providing server according to exemplary embodiments may be applicable to a moving picture as well as an image.

Figure 7:
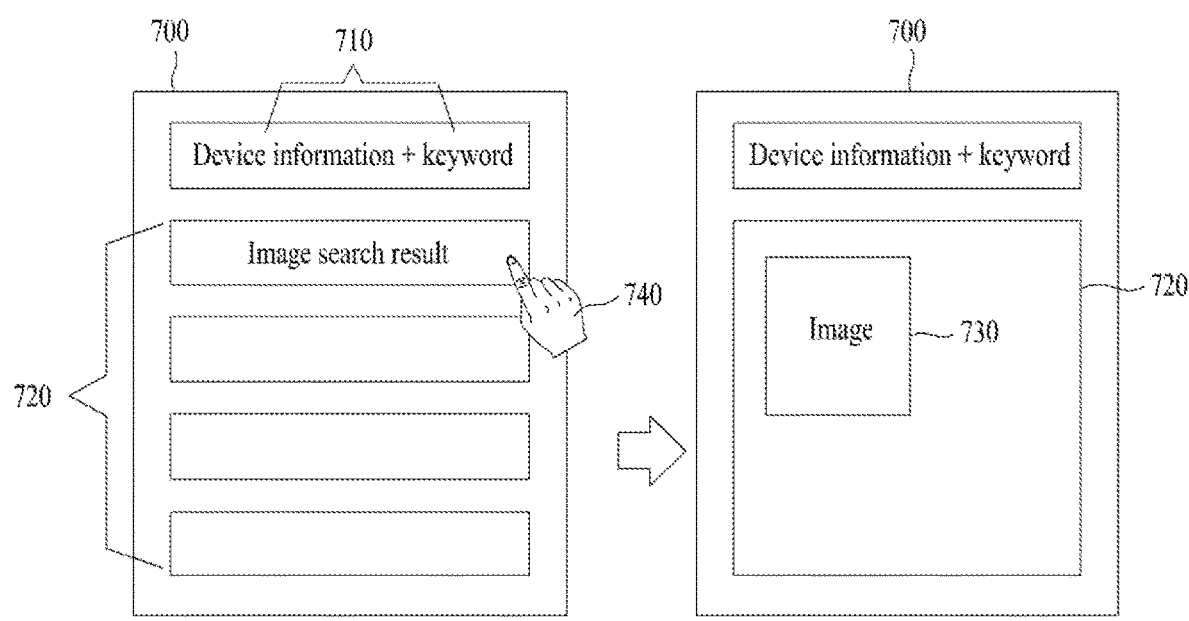
FIG. 7 illustrates an exemplary search screen comparing images by providing an image as a search result at an image search result providing server according to exemplary embodiments.

FIG. 7 illustrates an exemplary search screen comparing images by providing an image as a search result at an image search result providing server according to exemplary embodiments.

An example of providing an image as a search result in response to an input of a search query from a user on a search screen 700 is described with reference to FIG. 7. Referring to FIG. 7, a search query 710 may be input to an input box. The image search result providing server may identify device information from the search query 710. Here, the image search result providing server may determine that the device information is not included in the search query 710.

The image search result providing server may compare the device information to device information included in metadata of an image, and may index an image that matches the device information. When the device information matches the device information included in the metadata of the image, the image search result providing server may index the image that matches the device information. When the device information is not included in the metadata of the image, the image search result providing server may extract information associated with the device information from content that includes the image and may index the image included in the content.

The image search result providing server may provide the image that matches the device information to be displayed as a search result 720 of the search query 710 on a search screen 700. The image search result providing server may create the indexed image as new image content with respect to the search result 720 of the search query 710 and may provide the created new image content.

Also, when the identifier 320 decides that the search query 710 does not include any device information, the image search result providing server may provide an image searched according to the search query and the device information extracted from the metadata of the image as the search result 720 of the search query 710. For example, in response to the user's search for a keyword or an uploaded image, the image search result providing server may extract an image as the search result 720. Here, when device information is included in metadata of the image extracted as the search result 720, the image and device information of the image may be automatically displayed on the search screen 700.

The image search result providing server may display the content that includes the indexed image on the search screen 700. For example, an image may be captured by the user using a device that matches device information. Here, metadata may be set to the captured image, the image to which the metadata is set may be uploaded, and device information may be included in the metadata of the uploaded image. The image search result providing server may index an image that matches the device information among uploaded images and may provide the indexed image as the search result 720.

The image search result providing server may change the metadata of the image uploaded from the user in response to changing of the image uploaded from the user, and may indicate the change in the metadata. For example, when the uploaded image is corrected, the image search result providing server may edit the metadata of the image as well to indicate that the image was corrected.

The search result 720 in an image format may be displayed on the search screen 700. Referring to FIG. 7, a user 740 may select at least one search result 720 displayed on the search screen 700. The image search result providing server may provide detailed information of the search result 720 selected by the user 740. For example, the image search result providing server may provide, as the detailed information, an image 730 captured from the device that matches the device information and details, for example, comments, sense of color, reviews, and the like. Also, when providing the detailed information of the search result 720, the image search result providing server may simultaneously provide indexed images in association with the detailed information and may also provide details included in each image.

According to the exemplary embodiments, in response to an input of a search query that includes a plurality of pieces of different device information, an image search result providing server may provide an image of each piece of device information as a search result. For example, the image search result providing server may provide an image of each piece of device information in a comparable format. Alternatively, a representative image associated with each piece of device information may be provided as the search result. In response to a selection from a user on the search result, images including the representative image and details may be provided through a separate page.

According to the exemplary embodiments, an image search result providing server may precisely conduct an image search based on metadata of an image and may provide the image search result and thus, may outperform the inconvenience that requires a user to directly search for and compare images in the related art.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

According to exemplary embodiments, an image search result providing system may enhance the search quality by conducting an image search based on metadata of an image.

According to exemplary embodiments, exemplary embodiment an image search result providing system may index an image that matches device information included in a search query by comparing the device information to metadata included in an image, and may provide the image that matches the device information as a search result.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of providing an image search result including images produced by a device online using device information, the method comprising:
    receiving a textual input of a search query including model information of the device;
    identifying first device information of the device from the search query;
    indexing an image produced by the device that matches the first device information by comparing the first device information to second device information included in metadata of the image; and
    providing the indexed image produced by the device that matches the first device information as a search result of the search query,
    wherein the providing of the indexed image comprises:
        providing an image uploaded by a user that is captured from an example of the device matching the first device information as the search result, metadata of the uploaded image including the first device information,
    wherein the indexing of the image further comprises:
    extracting the second device information associated with the first device information from non-image content associated with the image in which the image is included, in response to determining that the metadata of the image does not include the second device information; and
    indexing the image included in the non-image content, and
    wherein the non-image content comprises one or more of a web document, a blog, or a news article of the device that is separate from and not a part of the first device information.

2. The method of claim 1, wherein the indexing of the image comprises:
    searching for the image associated with the first device information included in the search query; and
    determining whether the second device information is included in the metadata of the image.

3. The method of claim 1, wherein the identifying of the first device information comprises:
    identifying at least one of type information of the device, a model name of the device, and a name of the device as the first device information.

4. The method of claim 1, wherein the providing of the indexed image comprises:
    including the second device information in metadata of an image uploaded from a user that is captured from a device matching the first device information; and
    providing the uploaded image as the search result.

5. The method of claim 4, wherein the providing of the indexed image comprises:
    changing metadata of the image uploaded from the user in response to changing of the image uploaded from the user; and
    indicating the change in the metadata.

6. The method of claim 1, wherein the providing of the indexed image comprises:
    sorting and providing a plurality of images that match the first device information based on a predetermined criterion.

7. The method of claim 1, further comprising:
    providing an image searched according to the search query and the second device information extracted from the metadata of the image as the search result of the search query in response to identifying that the search query does not include the first device information.

8. A non-transitory computer-readable storage medium comprising instructions that, when executed by a processor, cause the processor to perform a method of providing an image search result including images produced by a device online using device information, comprising:
    receiving a textual input of a search query including model information of the device;

identifying first device information of the device from the search query;

indexing an image produced by the device that matches the first device information by comparing the first device information and second device information included in metadata of the image; and providing the indexed image produced by the device that matches the first device information to be output as a search result of the search query, wherein the providing of the indexed image comprises:
providing an image uploaded by a user that is captured from an example of the device matching the first device information as the search result, metadata of the uploaded image including the first device information, wherein the indexing of the image further comprises:

extracting the second device information associated with the first device information from non-image content associated with the image in which the image is included, in response to determining that the metadata of the image does not include the second device information; and indexing the image included in the non-image content, and wherein the non-image content comprises one or more of a web document, a blog, or a news article of the device that is separate from and not a part of the first device information.

9. An online image search result including images produced by a device providing system, comprising:

a memory; and at least one processor connected to the memory, and configured to execute computer readable instructions included in the memory, wherein the at least one processor is configured to:

receive a textual input of a search query including model information of the device;

identify first device information of the device from the search query;

index an image produced by the device that matches the first device information by comparing the first device information to second device information included in metadata of the image, and provide an image produced by the device matching the first device information as a search result of the search query, metadata of the uploaded image including the first device information, wherein the instructions to index the image further comprises instructions to cause the processor to:

extract the second device information associated with the first device information from non-image content associated with the image in which the image is included, in response to determining that the metadata of the image does not include the second device information; and index the image included in the non-image content, and wherein the non-image content comprises one or more of a web document, a blog, or a news article of the device that is separate from and not a part of the first device information.

10. The image search result providing system of claim 9, wherein the instructions to index the image further comprises instructions to cause the processor to search for the image associated with the first device information included in the search query, and to determine whether the second device information is included in the metadata of the image.

11. The image search result providing system of claim 9, wherein the instructions to identify first device information further comprises instructions to cause the processor to identify at least one of type information of the device, a model name of the device, and a name of the device as the first device information.

12. The image search result providing system of claim 9, wherein the instructions to provide the search result further comprises instructions to cause the processor to include the second device information in metadata of an image uploaded by a user that is captured from a device matching the first device information, and to provide the uploaded image as the search result.

13. The image search result providing system of claim 12, wherein the instructions to provide the search result further comprises instructions to cause the processor to change metadata of the image uploaded from the user in response to changing of the image uploaded from the user, and to indicate the change in the metadata.

14. The image search result providing system of claim 9, wherein the instructions to provide the search result further comprises instructions to cause the processor to sort and provide a plurality of images that match the first device information based on a predetermined criterion.

15. The image search result providing system of claim 9, wherein the instructions to provide the search result further comprises instructions to cause the processor to provide an image searched according to the search query and the second device information extracted from the metadata of the image as the search result of the search query in response to identifying that the search query does not include the first device information.

* * * * *